US007445547B2

(12) United States Patent

Suzuki

(10) Patent No.: US 7,445,547 B2

(45) Date of Patent: Nov. 4, 2008

(54) GAMING APPARATUS AND GAMING APPARATUS CONTROL METHOD

(75) Inventor: Takahiro Suzuki, Tokyo (JP)

(73) Assignee: Aruze Corporation, Tokyo (JP)

( * ) Notice: Subject to any disclaimer, the term of this patent is extended or adjusted under 35 U.S.C. 154(b) by 961 days.

(21) Appl. No.: 10/189,542

(22) Filed: Jul. 8, 2002

(65) Prior Publication Data

US 2003/0008701 A1 Jan. 9, 2003

(30) Foreign Application Priority Data

Jul. 6, 2001 (JP) ............................ 2001-206893

(51) Int. Cl.
*A63F 13/00* (2006.01)

(52) U.S. Cl. ........................................................ 463/16

(58) Field of Classification Search ............. 463/16–20; 273/138.1, 143 R See application file for complete search history.

(56) References Cited

U.S. PATENT DOCUMENTS 5,980,384 A * 11/1999 Barrie ........................ 463/16
6,089,977 A * 7/2000 Bennett ....................... 463/20
6,234,897 B1 5/2001 Frohm et al.
6,270,411 B1 * 8/2001 Gura et al. .................... 463/20
6,290,600 B1 * 9/2001 Glasson ....................... 463/20
6,419,579 B1 * 7/2002 Bennett ....................... 463/20
6,551,187 B1 * 4/2003 Jaffe .......................... 463/20
6,561,900 B1 * 5/2003 Baerlocher et al. ............ 463/20
6,585,591 B1 * 7/2003 Baerlocher et al. ............ 463/25
6,800,027 B2 * 10/2004 Giobbi et al. ................. 463/24
2002/0025844 A1 * 2/2002 Casey et al. ................... 463/16
2003/0008698 A1 * 1/2003 Stone .......................... 463/16

FOREIGN PATENT DOCUMENTS

| | | |
|---|---|---|
| EP | 874 337 | 10/1998 |
| EP | 879 624 | 11/1998 |
| EP | 1 067 491 | 1/2001 |
| EP | 1 083 531 | 3/2001 |
| JP | 6-233862 | 8/1994 |
| JP | 2000-14877 | 1/2000 |
| JP | 2001-9087 | 1/2001 |

* cited by examiner

*Primary Examiner*—Robert E Pezzuto
*Assistant Examiner*—Tramar Harper
(74) *Attorney, Agent, or Firm*—Leydig, Voit & Mayer, Ltd.

(57) ABSTRACT

A slot machine 10 comprises a display 20 having 3 rows by X columns (X being an integer of 5 or greater) of display regions, and a controller 50. Controller 50, in the event that bonus symbols 70, 71, and 72 are displayed in the (X−2) display regions in the center row of the 3 rows, excepting both side columns, starts a bonus game on the display. In the bonus game, the controller causes a prescribed character 66 to move on the display regions surrounding the (X−2) bonus symbols, and thereafter, selects a symbol by causing character 66 to perform a prescribed action on one of the display regions. Based on the type of the selected symbol, the content of the bonus awarded to the player is determined.

19 Claims, 18 Drawing Sheets

Fig.5

63

Pay Table

| Symbol | - Kind | 1K | 2K | 3K | 4K | 5K | pay |
|---|---|---|---|---|---|---|---|
| PIERROT | A | 2 | 10 | 100 | 1000 | 5000 | x line bet |
| GAL | B | | 10 | 25 | 200 | 500 | x line bet |
| LION | C | | 5 | 20 | 100 | 250 | x line bet |
| ELEPHANT | D | | 5 | 20 | 100 | 250 | x line bet |
| SEAL | E | | | 10 | 25 | 150 | x line bet |
| LOPE | F | | | 5 | 20 | 100 | x line bet |
| CLUB | G | | | 5 | 20 | 100 | x line bet |
| TENT | H | | | Tent Bonus Game | | | x line bet |
| TICKET | J | | | Super Circus Game | | | x total bet |
| BEAR | L | | | 2 | 5 | 20 | x total bet |

Fig.6

REEL STRIP

64

| | Reel 1 | Reel 2 | Reel 3 | Reel 4 | Reel 5 |
|---|---|---|---|---|---|
| 1 | A | G | F | H | A |
| 2 | E | E | B | A | H |
| 3 | C | J | J | J | C |
| 4 | E | H | C | L | B |
| 5 | H | G | F | G | G |
| 6 | G | F | H | H | E |
| 7 | E | L | F | G | G |
| 8 | H | A | G | E | H |
| 9 | G | D | H | F | B |
| 10 | E | L | F | E | D |
| 11 | H | G | F | G | C |
| 12 | G | H | C | D | G |
| 13 | D | J | J | H | F |
| 14 | E | G | D | G | H |
| 15 | F | E | F | C | E |
| 16 | G | C | F | E | H |
| 17 | E | L | C | G | F |
| 18 | H | D | L | E | B |
| 19 | E | C | G | H | L |
| 20 | G | F | F | F | C |
| 21 | B | H | F | H | G |
| 22 | E | G | D | D | F |
| 23 | G | J | J | F | H |
| 24 | E | E | B | C | D |
| 25 | L | G | F | H | H |
| 26 | E | D | G | F | E |
| 27 | G | B | F | E | H |
| 28 | B | C | E | H | G |
| 29 | E | D | F | E | F |
| 30 | F | F | E | F | G |
| 31 | G | C | A | H | D |
| 32 | E | L | F | B | H |

*Fig.14*

65

| TYPE OF SYMBOL | CODE | CONTENT OF BONUS |
|---|---|---|
| PIERROT | A | "CLOWN SHOWDOWN" GAME |
| GAL | B | "GIRL ON THE SWING" GAME |
| LION | C | "LION AND RING OF FIRE" GAME |
| ELEPHANT | D | "ELEPHANT RING TOSS" GAME |
| SEAL | E | BET NUMBER TIMES 2 |
| LOPE | F | BET NUMBER TIMES 2 |
| CLUB | G | BET NUMBER TIMES 2 |
| TENT | J | BET NUMBER TIMES 2 |
| BEAR | L | BET NUMBER TIMES 2 |

GAMING APPARATUS AND GAMING APPARATUS CONTROL METHOD

BACKGROUND OF THE INVENTION

1. Field of the Invention

The present invention relates to a gaming apparatus which displays symbols in a plurality of display regions and determines winnings based on the arrangement of the symbols, a method of controlling the gaming apparatus, and a computer-readable recording medium on which is stored a program for controlling the gaming apparatus.

2. Related Background Art

Slot machines can be cited as typical examples of gaming apparatuses in which the symbols to be displayed in each of a plurality of display regions are determined by random values and winnings are determined based on the arrangement of the symbols on the display. With the recent "game boom," slot machines are gaining great popularity in casinos and game centers.

With conventional slot machines, those having display regions consisting of 3 rows and 3 columns have been the mainstream, but recently, slot machines having display regions in 4 or more columns have begun to appear. With this kind of slot machine, it is possible to set up a "pay line," a line which determines winnings, in a variety of ways, such as a zigzag line. This results in increased player interest in the slot machine.

In addition, as a scheme for increasing player interest, it has become a popular trend to offer bonus games on the slot machine. These bonus games are awarded when, for example, symbols occur in a specified arrangement, and the player is awarded a monetary prize or a token according to the results of the bonus game.

SUMMARY OF THE INVENTION

The above-mentioned conventional gaming apparatuses, in general, are mostly of the type where bonus games are started when a predetermined number of bonus symbols are lined up from the left. The bonus game proceeds on a second display, which is different from the display which displays the normal slot machine game. Players who want more excitement are not satisfied with gaming apparatuses which have this kind of conventional bonus game, and want even newer gaming apparatuses to appear.

In addition, in recent years game content has become increasingly complicated and it is important that players be able to readily recognize when the machine is in a bonus game. If the aspect of making game content more enjoyable is pursued excessively, to the extent that players cannot grasp the overly-complicated game content, the result is that player interest in the game wanes.

The present invention has been designed in order to solve the aforementioned problems, and it is an object thereof to provide a gaming apparatus which can attract player interest by renewing the content of bonus games and can make it easy for the player to recognize that the machine is in a bonus game, a method of controlling the gaming apparatus, a program, and a computer-readable recording medium.

The present invention comprises a display having display regions for displaying symbols in 3 rows by X columns (where X is an integer 5 or larger), and a controller which executes a prescribed program and controls a display content of the aforementioned display. In response to the aforementioned program, the controller determines which of the symbols from among a plurality of kinds of symbols, including special "bonus symbols", is to be displayed in each of the display regions, and determines winnings based on the arrangement of symbols displayed in the display regions. In the case that bonus symbols are displayed in each of the (X−2) display regions which are on the center row of the aforementioned three rows, but excluding the regions in both side columns, a bonus game will be started on the display. In the bonus game, a predetermined character is caused to move on the display regions which surround the (X−2) bonus symbols, and then this character is made to perform a predetermined action on one of the plurality of display regions. The content of a bonus to be awarded to the player is determined based on the type of symbol displayed in the display region where the character performs the predetermined action.

With the gaming apparatus of the present invention, a bonus game starts when bonus symbols are displayed in the (X−2) display regions of the display regions arranged in X columns but excluding both side columns, and which are on the center row of the plurality of display regions formed in three rows. In this way, by making it such that the bonus game starts whenever bonus symbols appear in the columns other than the two edge display regions, without the requirement that a bonus symbol be lined up in the leftmost display region, a freshness can be provided to the player.

In addition, when the bonus game begins, the controller moves a prescribed character on the display regions surrounding the (X−2) bonus symbols positioned in the central portion. Here, the character moves over the top row, the bottom row and the left and right side columns of the plurality of display regions. That is, since the (X−2) bonus symbols line up in the central portion, a pathway for the character to travel is formed surrounding those bonus symbols.

In this way, by creating a link between the conditions which cause a bonus game to start and the content of the bonus game, greater player attraction toward the gaming apparatus can be achieved. In addition, because bonus games proceed on the display where the symbols are arranged, the player can readily grasp that the machine is now in a bonus game.

In a bonus game, the above-mentioned character performs a predetermined action on one of the plurality of display regions. Then, based on the type of symbol displayed in the display region where that action is performed, the controller determines the content of the bonus to be awarded to the player.

Some examples of bonuses to be awarded to players as a result of the bonus game are payout of coins or the playing of another bonus game.

In addition, in the gaming apparatus according to the present invention, a storage means can be provided for storing a table showing the correspondence relationship between the type of symbol and the bonus content, and the controller can be configured such that it determines the content of the bonus to be awarded to the player based on the table of the storage means.

In the gaming apparatus according to the present invention, in the case that a bonus symbol is displayed in each of the X columns except for both side columns, it is preferable that the controller move the bonus symbols to the center row of each of the columns and cause the bonus game to start.

In this case, it is sufficient if the bonus symbols are displayed in each column of the X columns except for both side columns, and even if they do not line up in the center row of the three rows, the bonus game will be started. As a result, the player feels that the chance of being able to play a bonus game is high, and even more interest can be drawn to the gaming apparatus.

In addition, if the gaming apparatus according to the present invention is made as a slot machine, the controller may determine, from among the plurality of types of symbols, which symbols to display in each of the display regions according to random number values.

If the gaming apparatus according to the present invention is made as a slot machine, the controller may be configured so that it displays an image of three rows by X columns of slot machine reels on the display.

In addition, in the gaming apparatus according to the present invention, in the bonus game, it is preferable that, after awarding the bonus to the player, the character be caused to move again over the display regions surrounding the bonus symbols, and that afterward the character be made to perform the predetermined action on one of the display regions.

In this case, it is possible for the player to gain bonuses over a plurality of plays, and interest in the gaming apparatus can be enhanced.

In this case it is also preferable that the cause a mark to be displayed on the display region where the character performs the predetermined action to show that the character has performed the action there. It is also preferable that, in the case that the character performs the predetermined action on a display region where a mark is already displayed, the bonus game be made to end.

In the case that a character selects a display region which has already been selected and shows a mark, the bonus game is made to end. In this way, the player hopes that the character will not perform the predetermined action on a display region where a mark is displayed, and thus the bonus game is made even more thrilling.

In addition, with the gaming apparatus according to the present invention, it is preferable that a second display be further provided and that, in the case that an opportunity for another bonus game is provided to the player as a result of a bonus game, this other bonus game be displayed on the second display.

In this way, by running the other bonus game on a display different from that of the first bonus game, a clear sense of the start of the new game is conveyed to the player and the entertainment level is enhanced.

The gaming apparatus control method according to the present invention comprises a display having display regions on which symbols are to be displayed, and a controller that executes a prescribed program and controls the display content of the display. The gaming apparatus control method comprises the steps of: displaying on the display the display regions as 3 rows and X columns (where X is an integer of 5 or larger); determining, from among a plurality of types of symbols including special bonus symbols, which of the symbols to display on the various display regions; determining winnings based on the arrangement of displayed symbols on the display regions; starting a bonus game on the display in the case that the bonus symbols are displayed in each of the (X−2) display regions on the center line of the three lines, but excluding both side columns; causing a prescribed character in the bonus game to move on the display regions which surround the (X−2) bonus symbols and then causing the character to perform a specific action on one of the plurality of display regions; and determining the content of the bonus to be awarded to the player based on the type of symbol displayed in the display region where the character performs the prescribed action.

With the gaming apparatus control method according to the present invention, a bonus game starts when bonus symbols are displayed in each of the abovementioned (X−2) display regions of the display regions arranged in X columns, but excluding both side columns, which are on the center row of the plurality of display regions formed in three rows. In this way, by making it such that the bonus game starts whenever bonus symbols appear in columns other than the two end display regions, without the requirement that a bonus symbol be lined up in the leftmost display region, a freshness can be provided to the player.

In addition, when the bonus game begins, the controller moves a predetermined character on the display regions which surround the (X−2) bonus symbols positioned in the central portion. Here, the character moves over the top row, the bottom row and the left and right side columns of the plurality of display regions. That is, since the (X−2) bonus symbols line up in the central portion, a pathway for the character to travel is formed surrounding those bonus symbols.

In this way, by creating a link between the conditions which cause a bonus game to start and the content of the bonus game, greater player attraction toward the gaming apparatus can be achieved. In addition, because bonus game play proceeds on the display where the symbols were arranged, the player can readily grasp that the machine is now in a bonus game.

In a bonus game, the character performs a prescribed action on one of the plurality of display regions. Then, based on the type of symbol displayed in the display region where that action is performed, the controller determines the content of the bonus to be awarded to the player.

In addition, in the gaming apparatus control method according to the present invention, a storage means may be provided for storing a table showing the correspondence relationship between the type of symbol and the bonus content, and the content of the bonus may be determined based on the table of the storage means in the step for determining the content of the bonus to be awarded to the player.

In the gaming apparatus control method according to the present invention, in the case that a bonus symbol is displayed in each of the X columns except for both side columns, it is preferable that the controller move the bonus symbols of each of the columns to the center row of the 3 rows and cause the bonus game to start.

In this case, it is sufficient if the bonus symbols are displayed in each column of the X columns except for both side columns, and even if they do not line up in the center row of the three rows, the bonus game will be started. As a result, the player feels that the chance of being able to play a bonus game is high and even more interest can be drawn to the gaming apparatus.

The program according to the present invention causes the following steps to be executed by a computer: displaying on the display the display regions on which symbols are to be displayed as 3 rows by X columns (where X is an integer of 5 or larger); determining, from among a plurality of types of symbols including special bonus symbols, which of these symbols to display on each of the display regions; determining winnings based on the arrangement of symbols displayed on the display regions; starting a bonus game on the display in the case that the bonus symbols are displayed in each of the (X−2) display regions on the center line of the 3 lines, but excluding both side columns; causing a prescribed character in the bonus game to move on the display regions which surround the (X−2) bonus symbols, and then causing the character to perform a predetermined action on one of the plurality of display regions; and determining the content of the bonus to be awarded to the player based on the type of symbol displayed in the display region where the character performs the predetermined action.

The computer-readable recording medium according to the present invention is characterized in that the aforementioned program is stored therein.

By running this kind of program on a computer, the kind of effect discussed in the description of the aforementioned gaming apparatus and gaming apparatus control method can be obtained. That is, by creating a link between the conditions which cause a bonus game to start and the content of the bonus game, greater player attraction toward the gaming apparatus can be achieved. In addition, because the bonus game takes place in succession on the display where the symbols are arranged, the player can readily grasp that the machine is now in a bonus game.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings in which:

FIG. 5 shows the slot machine pay table;

FIG. 6 is a symbol table showing the symbols displayed on each reel;

FIG. 14 is a table showing the correspondence relationship between the selected symbol and the content of the bonus;

DESCRIPTION OF THE PREFERRED EMBODIMENTS

Below, the preferred embodiments of the present invention are described in detail, referring to the accompanying drawings. Note that the same key numbers are used for identical elements and redundant explanations are omitted.

Figure 1:
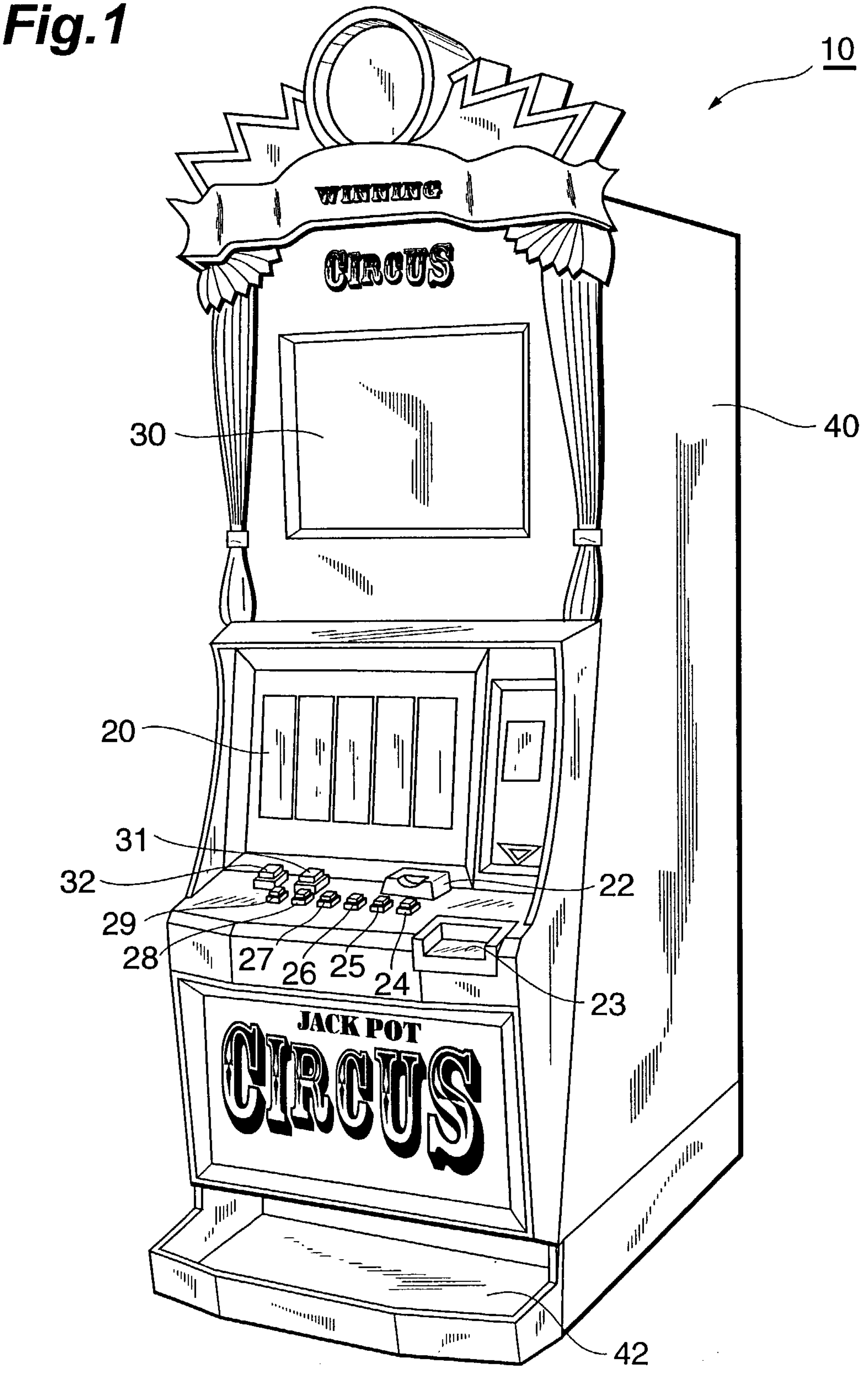
FIG. 1 is a perspective view showing the external appearance of a gaming apparatus (slot machine) according to the present invention.

FIG. 1 is a perspective view showing the external appearance of slot machine (gaming apparatus) 10 according to the present embodiment. In the slot machine 10, the lower side of cabinet 40 is equipped with a main display 20 for digital display of the slot game, and the upper side of cabinet 40 is equipped with a second display 30 for digital display of the sub-game which will be described later. Both the main display 20 and the second display 30 are liquid crystal displays, and the main display 20 is a touch screen display.

Below and in front of main display 20 are provided a coin slot 22 for inserting a medium such as a token or coin (below, these are referred to by the general term "coin"), and a bill inserter 23 for inserting money bills. The player can play the slot game using either coins or bills. Of course, it is also possible to design the apparatus such that the game is conducted using only coins or bills. In addition, in the lowest part of cabinet 40, a coin receiving part 42 is provided where the player receives the coins that are paid out.

In front of coin slot 22, six push buttons are arranged. These are buttons provided on commonly known slot machines, and in order from the left include: a start button 24 for directing the start of symbol rotation, a BET button 25 for indicating 1 BET, a MAXBET button 26 for placing a BET from the number of remaining credits up to the maximum bet number (for example 30), a REPEATBET button 27 for placing a BET of the same amount as in the previous play, a collect button 28 for confirming the coins which have been won in the games, and a payout button 29 which instructs that the coins be paid out. In addition, to the left of coin slot 22 in the figure, two selection buttons 31 and 32 are provided for use in sub-games (described below) which are played on second display 30.

Figure 2:
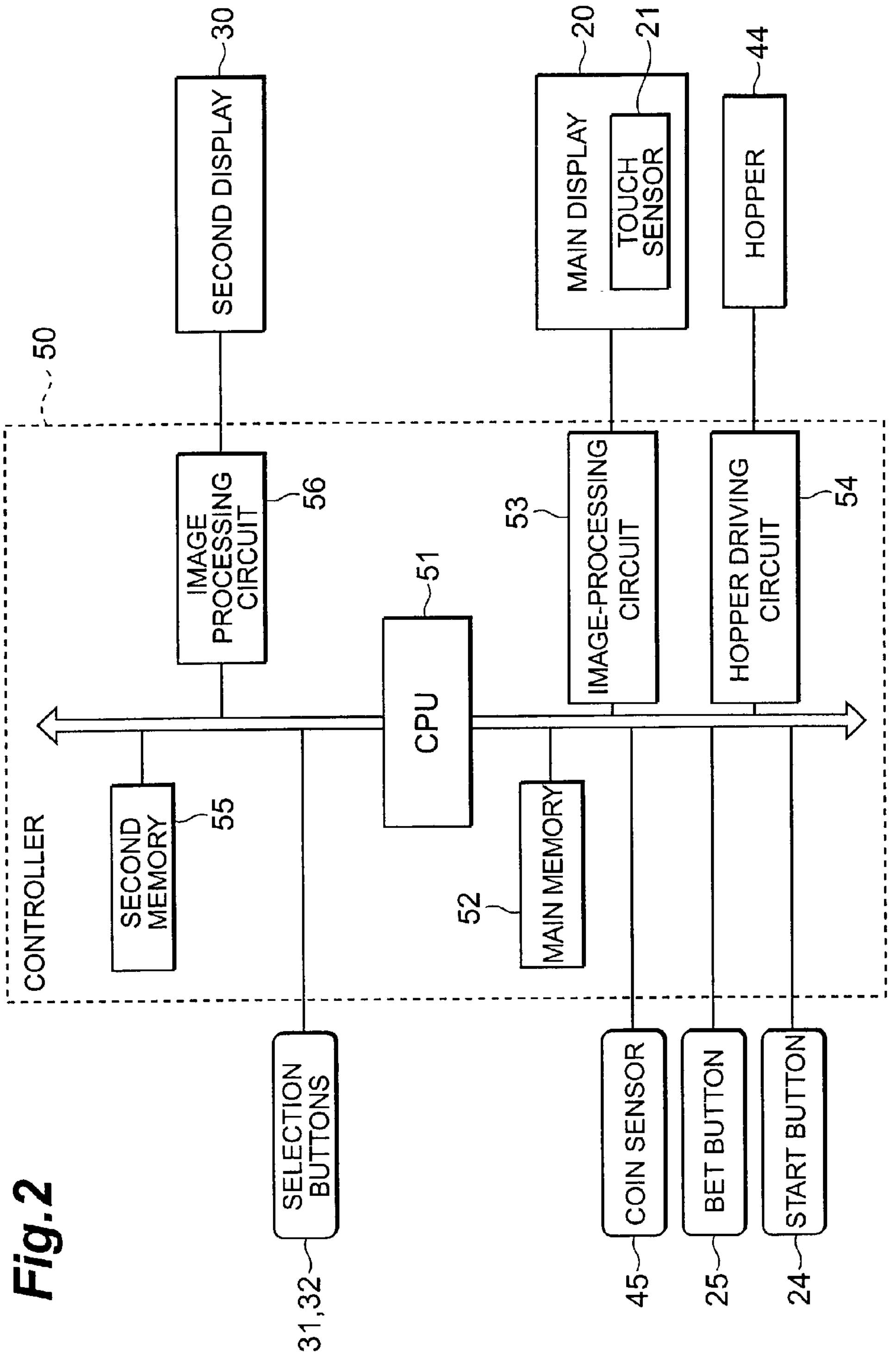
FIG. 2 is a block diagram showing the controller that controls the processing of the slot machine of FIG. 1.

FIG. 2 is a block diagram showing the controller 50 that controls the processing of slot machine 10 of this embodiment and the various actuators which are electrically connected thereto.

Included in controller 50 are: a CPU 51 for integrating the various control functions; main memory 52, serving as a storage means storing the program and data necessary for the slot game; an image processing circuit 53 which has Video RAM and controls the display content of the main display 20; a hopper driving circuit for controlling a hopper 44 which pays out the accumulated coins to the player; second memory 55, serving as a storage means storing the program and data necessary for the sub-games; and an image processing circuit 56 which has Video RAM and controls the display content of the second display 30. In addition, between CPU 51 and the various actuators, I/O ports and so on are appropriately placed.

The main memory 52 has a ROM area and a RAM area, and in the ROM area are included at least a program which includes a module for executing the slot game and bonus game (described below), and data related to symbol images and to a pay table showing the payout according to the symbol arrangement. Meanwhile, variable data such as the player BET number, credit number, etc. are written in the RAM area of main memory 52. A ROM area and RAM area are similarly provided in the second memory 55. A program and data relating to the sub-games are written in the ROM area. In addition, a touch sensor 21 is installed in the main display 20 and the player can input various kinds of information by touching the display screen.

Further, connected to CPU 51 via a bus are: a coin sensor 45 for detecting the insertion of a coin, a start button 24, a BET button 25, selection buttons 31 and 32, etc. In addition, although omitted from the drawings, various buttons, a bill sensor, etc. are also connected to the controller 50. Also, the aforementioned hopper 44 and coin sensor are contained in the cabinet 40 shown in FIG. 1.

Figure 3:
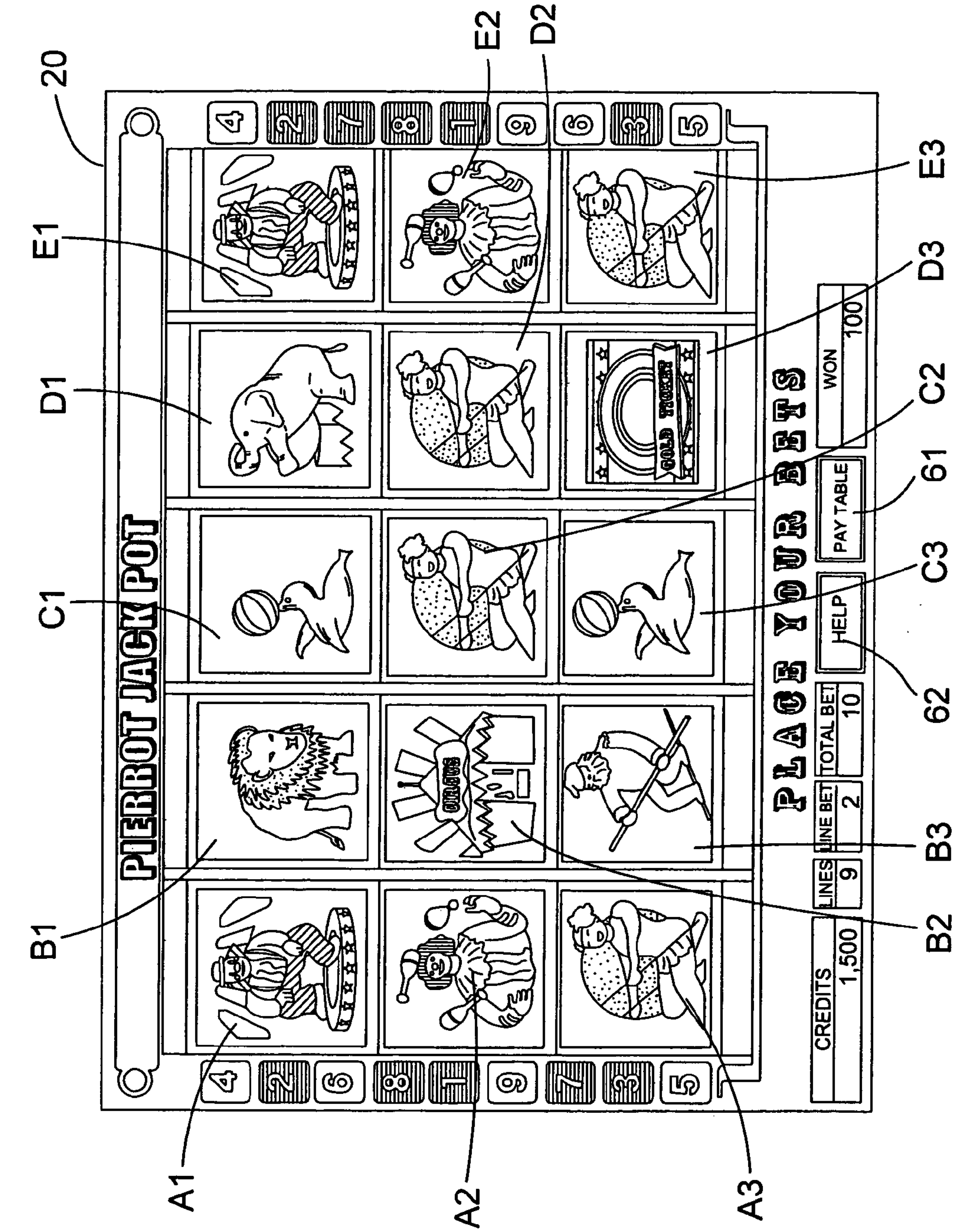
FIG. 3 is an illustration showing the display screen of the main display.

FIG. 3 is an illustration showing the display screen of the main display 20. In the present embodiment, a total of 15 display regions, 3 rows by 5 columns, are provided for displaying a plurality of symbols. In addition, image processing is performed such that reels with a plurality of types of symbols depicted on the circumferences thereof rotate, and when each reel stops, selected symbols are displayed in display regions A1 through A3, B1 through B3, C1 through C3, D1 through D3, and E1 through E3.

In addition, below the display regions, the following are displayed: number of remaining credits, number of effective lines (LINES), LINE BET, which is the BET number for each line, TOTAL BET, which is the total number which the player has bet this time, the payout amount the player has won in this game (WON), etc. In addition, on main display 20 are displayed: PAY TABLE key 61 for instructing display of the pay table which shows the amounts which are paid to players, and HELP key for requesting advice when the game method, etc. is unclear. When the player touches these keys 61 and 62, that touch is detected by touch sensor 21, and a pay table and an explanation of the operating method are displayed on the screen respectively.

Figure 4A:
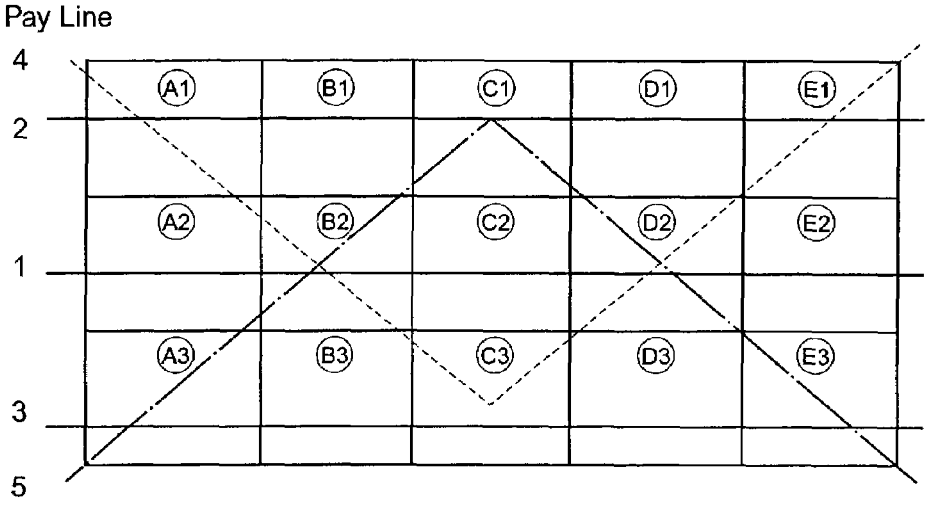
FIG. 4A and FIG. 4B are diagrams showing the "pay line" of slot machine 10.
Figure 4B:
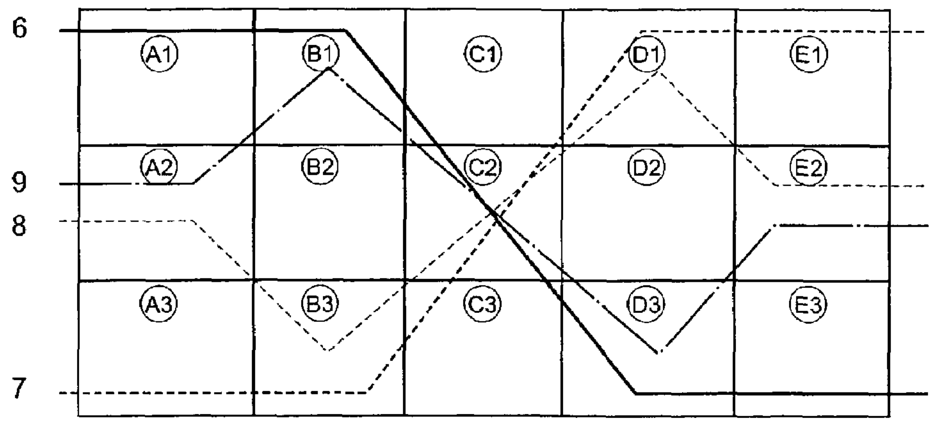

FIG. 4A and FIG. 4B are diagrams showing the pay lines of slot machine 10. To simplify comprehension, pay lines are shown, separated into two figures. As shown in each figure, in this game, nine pay lines have been prepared. If the prescribed symbols line up on any of these pay lines, a payout is paid to the player according to the prescribed line up. With the 3 row by 5 column layout of the present embodiment, because the number of columns has been increased in this way, a variety of pay lines can be configured.

FIG. 5 shows pay table 63 of slot machine 10. As described above, the information of this pay table 63 is stored ahead of time in main memory 52 and when the player touches the PAY TABLE key 61 of main display 20, the table is displayed on the screen. In this slot game, the symbols are ranked in the following order: PIERROT (clown), GAL (pretty girl), LION, ELEPHANT, SEAL, LOPE (tightrope walker), CLUB (juggler), TENT, TICKET, and BEAR. In addition, to classify the symbols, they are assigned codes from A to G and J and L. Then, for example, if three of the LOPE (tightrope walker) symbols line up in order from the left reel, the player's monetary prize is an amount 5 times the BET number wagered on the reel where the symbols lined up.

The TICKET symbols shown by code J are bonus symbols for starting the bonus game. The TICKET symbols can be displayed on the reels of columns 2, 3, and 4, and symbols for those columns are respectively a TICKET symbol with the letters "CIR" displayed, a TICKET symbol with the letters "CUS" displayed, and a TICKET symbol with the words "GOLD TICKET" displayed on a banner (see FIG. 9). That is, the TICKET symbol cannot be displayed in the leftmost display region or in the rightmost display region.

Details will be provided later in the description relating to the method, but if TICKET symbols are displayed in each of the second, third and fourth reels, regardless of the row, a decision is made to switch to the bonus game. For the bonus game, the TICKET symbols move to display regions B2, C2, and D2. Afterward, the clown character appears on main display 20, moves on the area surrounding the TICKET symbols, and selects one of the symbols displayed in that surrounding area.

Then the content of the bonus to be awarded to the player is determined according to the type of symbol selected.

The control relating to this kind of bonus game is performed through cooperative working of the CPU 51 of controller 50, main memory 52, image processing circuit 53 and main display 20.

FIG. 6 is symbol table 64 which shows the symbols displayed on each reel. The information for symbol table 64 is stored in main memory 52. The letters in the table indicate the symbol types shown in FIG. 5. For example, TICKET symbols (shown by "J") are in positions 3, 13, and 23 of the second reel; positions 3, 13, and 23 of the third reel; and position 3 of the fourth reel. In the display regions of main display 20, images are formed as though symbols were depicted on reels in the order shown in this table 64.

Next, the control method of the slot machine of the present embodiment will be described referring to the flow charts of FIG. 7 and FIG. 8.

Figure 7:
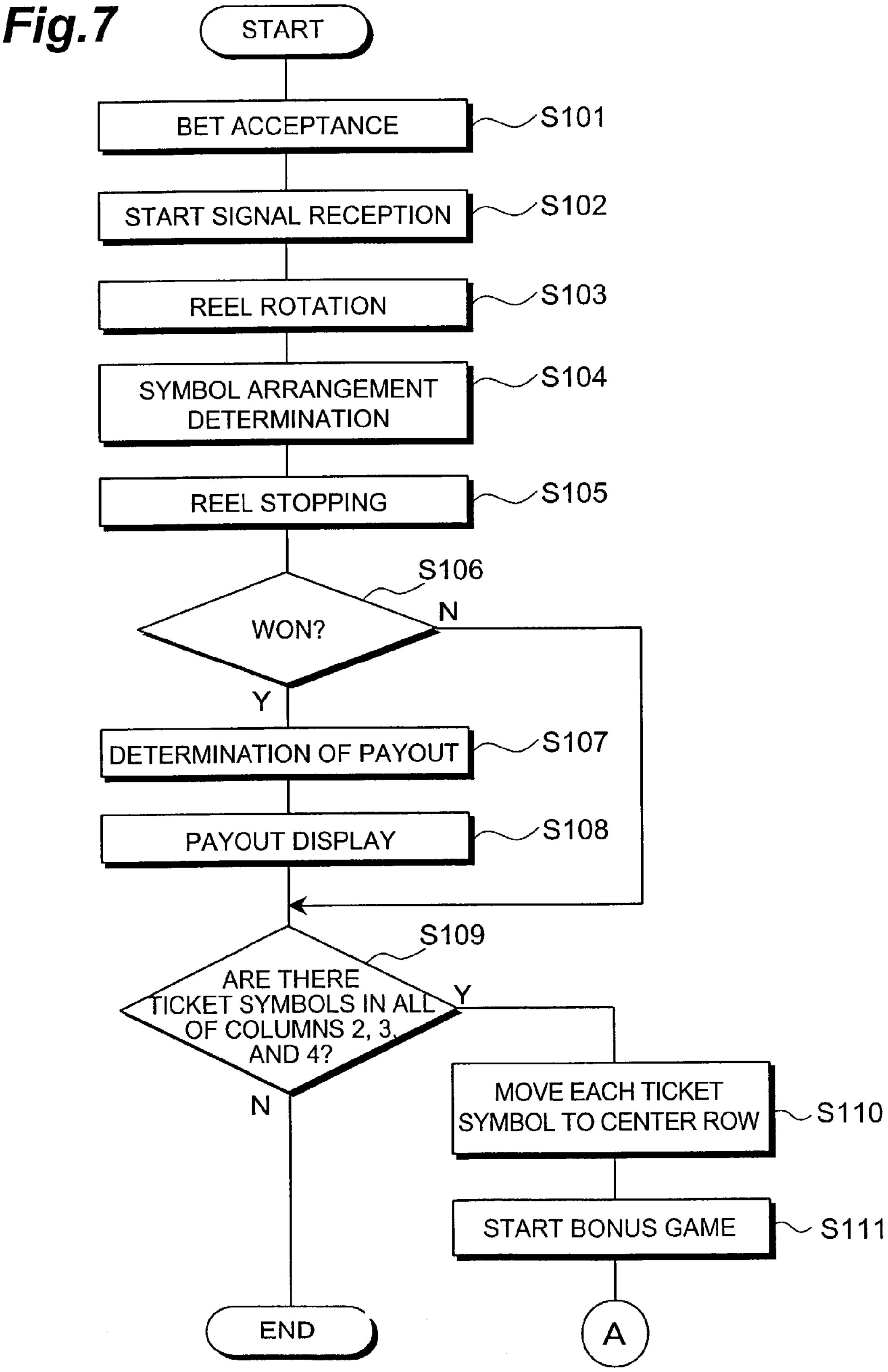
FIG. 7 is a flow chart showing the slot machine control method up to the start of a bonus game.

First, referring to FIG. 7, the control method of slot machine 10 is explained up to the start of a bonus game.

When slot machine 10 is operated, CPU 51 accesses main memory 51 and transfers to image processing circuit 53 the information related to the basic screen of the slot game, such as a framework to form the display region, PAY TABLE key 61, etc. In image processing circuit 53, this information, after once being stored in Video RAM, is displayed on main display 20. In this way, the slot machine goes into the state where a player can play the slot game. The following processing is accomplished by running the module relating to the slot game on CPU 51, the program having been stored in main memory 52.

In step 101 (below, "step" is abbreviated as "S"), CPU 51 of controller 50 awaits the player's BET. A BET can be placed in a situation where credits remain, and the player indicates the BET number using any of the BET button 25, MAXBET button 26, or REPEATBET button 27.

When BET placing is complete, the player pushes start button 24 (S102) and the reels begin to spin on main display 20 (S103). Specifically, CPU 51, having received a start signal from start button 24, controls image processing circuit 53 and causes it to perform image processing so that it appears that actual reels are indeed spinning. Note that in the case that a player pushes the MAXBET button 26 or REPEATBET button 27, the reels begin to spin without having to push start button 24.

After the reels begin spinning, CPU 51 generates random numbers by means of the program in main memory 52, and according to those values, determines the position where each reel stops, in other words, determines the symbol to be displayed in each display region (S104). Note that this kind of selection based on random number values may be performed with any desired timing. For example, selection may be performed when start button 24 is pushed or selection may be redone whenever the BET button is pushed.

Next, CPU 51 controls image processing circuit 53 to stop each reel on main display 20 (S105). It may be set such that, at this time, one symbol is invariably displayed in each display region, or it may be set such that there are cases where, based on the random number values, symbols are not displayed or only a part of the symbols are displayed. In the present embodiment, it is set that one symbol will invariably be displayed in each display region.

After the reels stop, CPU 51 makes a judgment as to winnings (S106). Since the judgment about winnings can be made at the time that the symbol arrangement is determined in S104, S106 may be placed before S105. Then, in the case that the symbols are in a winning arrangement, CPU 51, based on pay table 63 stored in main memory 52, determines the payout to be paid to the player (S107) and causes the payout amount to be displayed in the "WON" column of main display 20 (S108). On the other hand, in the case of no win in S106, processing proceeds straight to S109, without passing S107 or S108.

In S109, CPU 51 determines whether or not TICKET symbols are displayed in all of columns 2, 3, and 4 (S109). In other words, it determines whether it can switch to a bonus game or not. In the present embodiment, even if the TICKET symbols in columns 2, 3, and 4 are all in different rows, it is made to switch to a bonus game. Note that this judgment can be made at any time, as long as it is after the determination of symbol arrangement in S104.

If a situation occurs in which TICKET symbols are not displayed on all reels 2, 3, and 4, the slot game ends and, for example, "GAME OVER" is displayed on the main screen.

Figure 9:
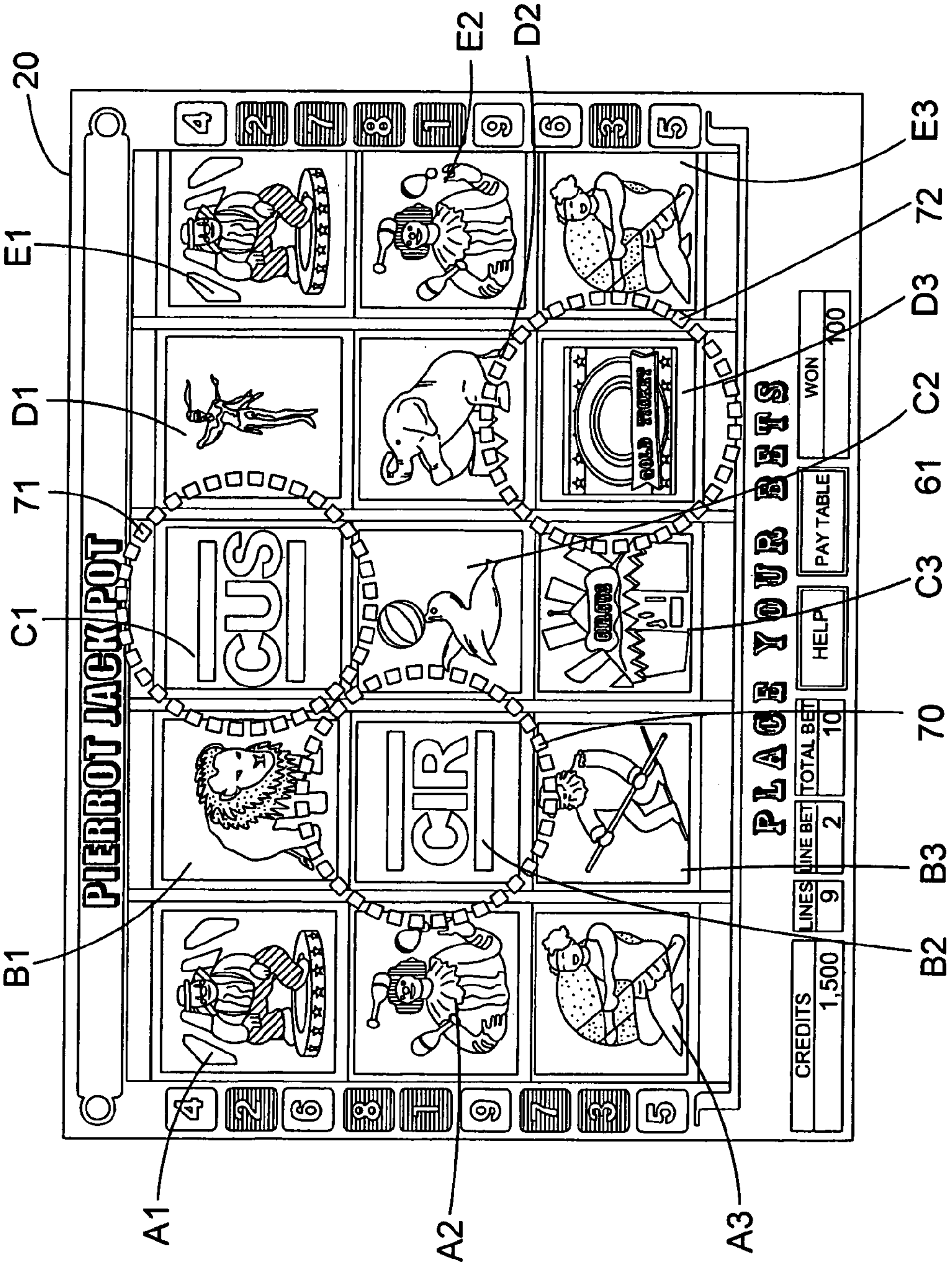
FIG. 9 is an illustration showing a situation where three bonus symbols are displayed on the main display.

On the other hand, in the case that, as shown in FIG. 9, TICKET symbols are displayed on all reels 2, 3, and 4, a determination is made to switch to a bonus game. In the same figure, TICKET symbols 70, 71, and 72, which are bonus symbols, are displayed in display regions B2, C1, and D3 (TICKET symbols are encircled by a broken line). In this way, by making it such that the bonus game starts whenever TICKET symbols (bonus symbols) appear in columns other than the two end display regions, without the requirement that TICKET symbols be lined up from the leftmost display region, a freshness can be provided to the player.

Figure 10:
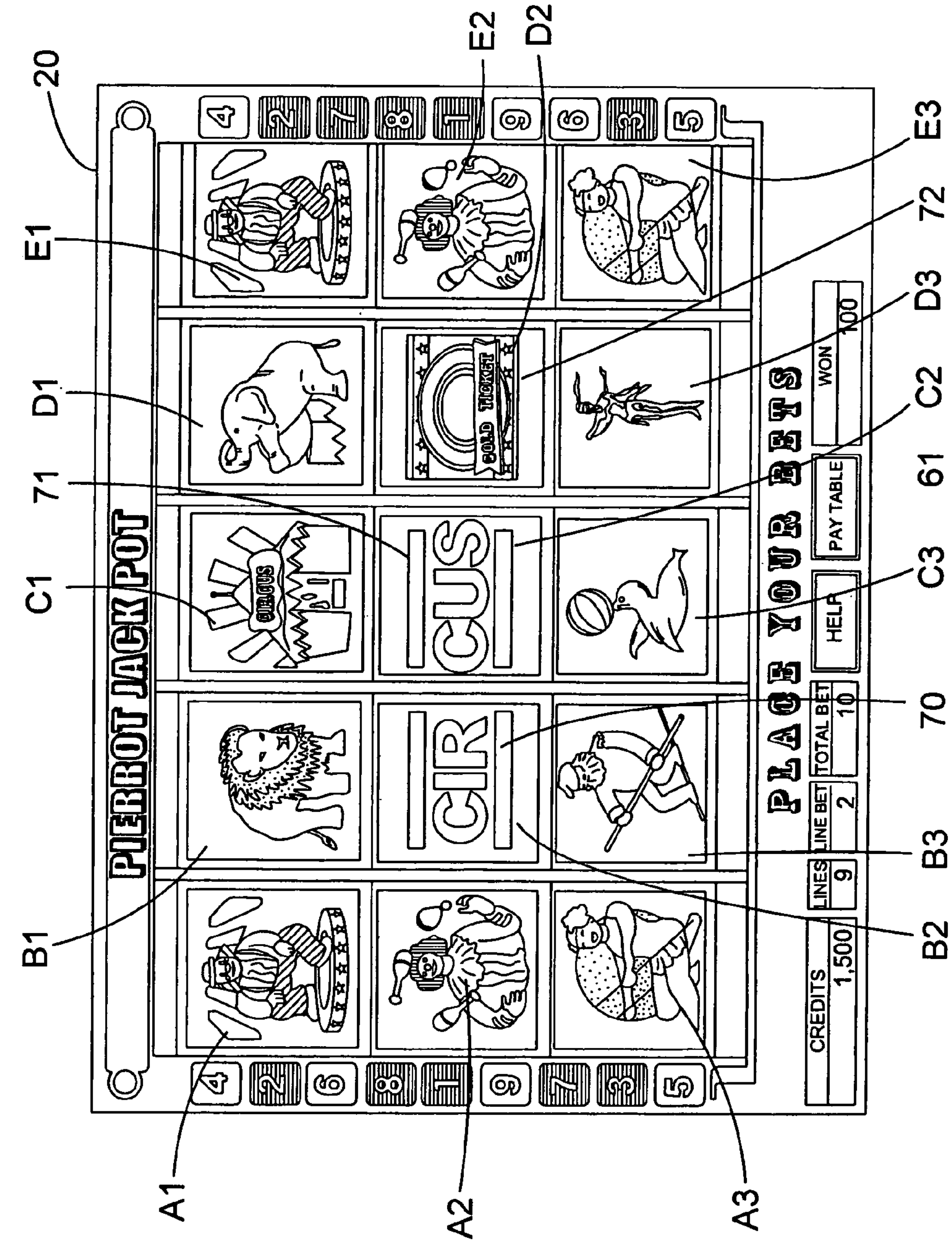
FIG. 10 is an illustration showing a situation where the three bonus symbols have been moved to the center line on the main display.

As shown in FIG. 10, CPU 51 controls image processing circuit 53 to moves TICKET symbols 70, 71, and 72 to the center row of the three rows, that is, to display regions B2, C2, and D2 (S110). In other words, TICKET symbols 70, 71 and 72 become surrounded by one line of circumjacent display regions. In this way, preparations for the bonus game are completed and the bonus game is started.

Figure 8:
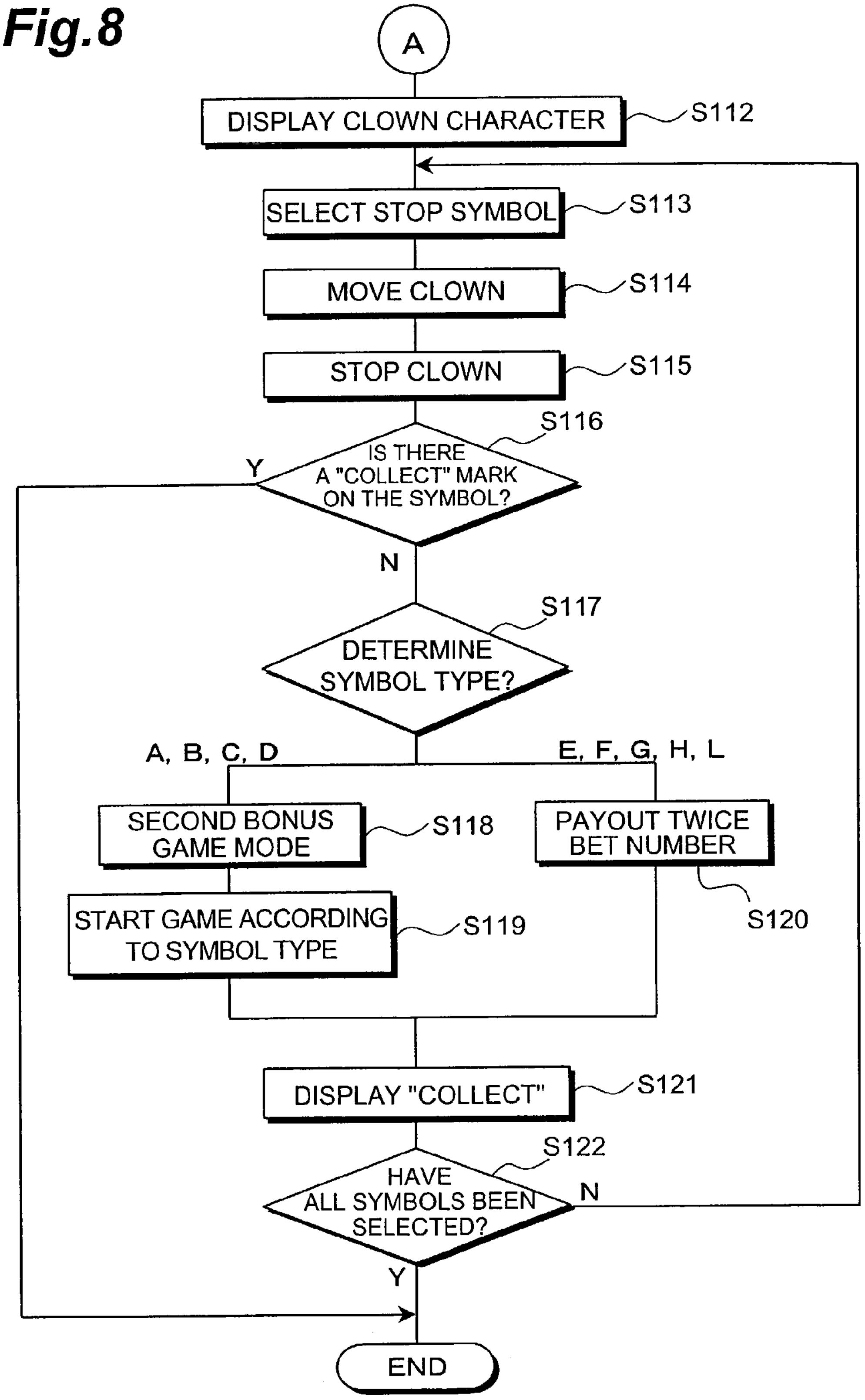
FIG. 8 is a flow chart showing the slot machine control method during a bonus game.

FIG. 8 is a flow chart showing the method of control of slot machine 10 during the bonus game. The following processing is performed by CPU 51's executing the module relating to the bonus game of the program stored in main memory 52.

Figure 11:
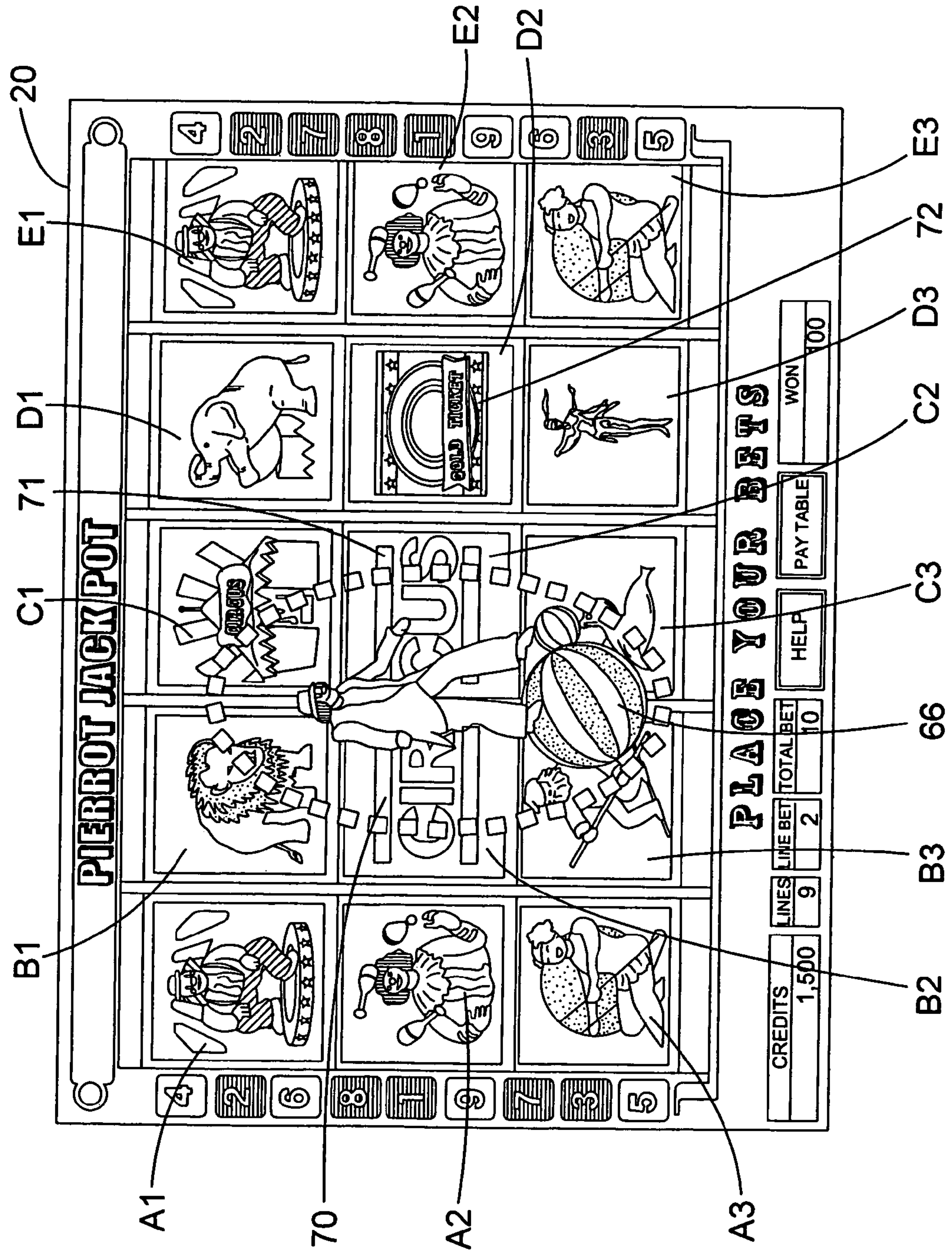
FIG. 11 is an illustration showing a situation where the clown character has appeared on the main display.

When the bonus game starts, first in S112, CPU 51 controls image processing circuit 53, and as shown in FIG. 11, the character of a clown 66 riding on a large ball is displayed on main display 20. The image information of this clown character is stored ahead of time in main memory 52.

Next, based on random number values obtained by the program in main memory 52, CPU 51 determines on which display region clown character 66, which will later be made to move, will be stopped (S113). Here, it is assumed that display region D1 is selected. As indicated above, since it has been set in the present embodiment that one symbol will invariably be displayed in each display region, it may be said that in S113, it is the symbol where the clown character will stop which is selected.

Figure 12:
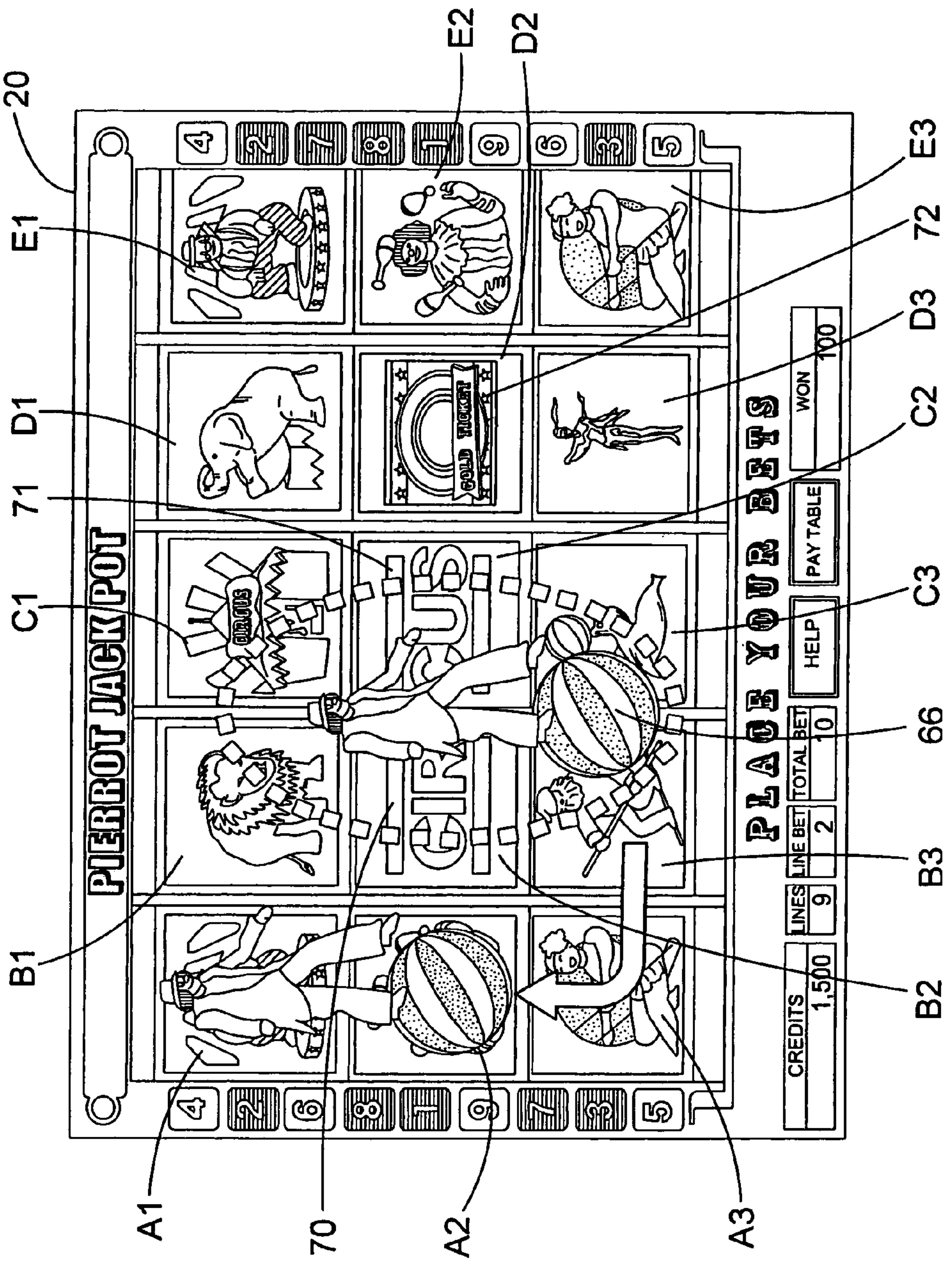
FIG. 12 is an illustration showing a situation where the clown character is moving on the main display.

Thereafter, as shown in FIG. 12, image processing circuit 53, under the control of CPU 51, causes clown character 66 to move over the display regions surrounding the three TICKET symbols 70, 71, and 72 which are displayed in central display regions B2, C2, and D2 (S114). The direction of movement may be either clockwise or counter-clockwise, and it is also acceptable to have movement which alternates these directions. At this time, clown character 66 moves across the upper row, the lower row, and the right and left end columns of the plurality of display regions. In other words, a pathway for the movement of clown character 66 is formed of the regions surrounding the bonus symbols which are lined up in the center parts of the three out of five reel columns which are not the two end ones.

Figure 13:
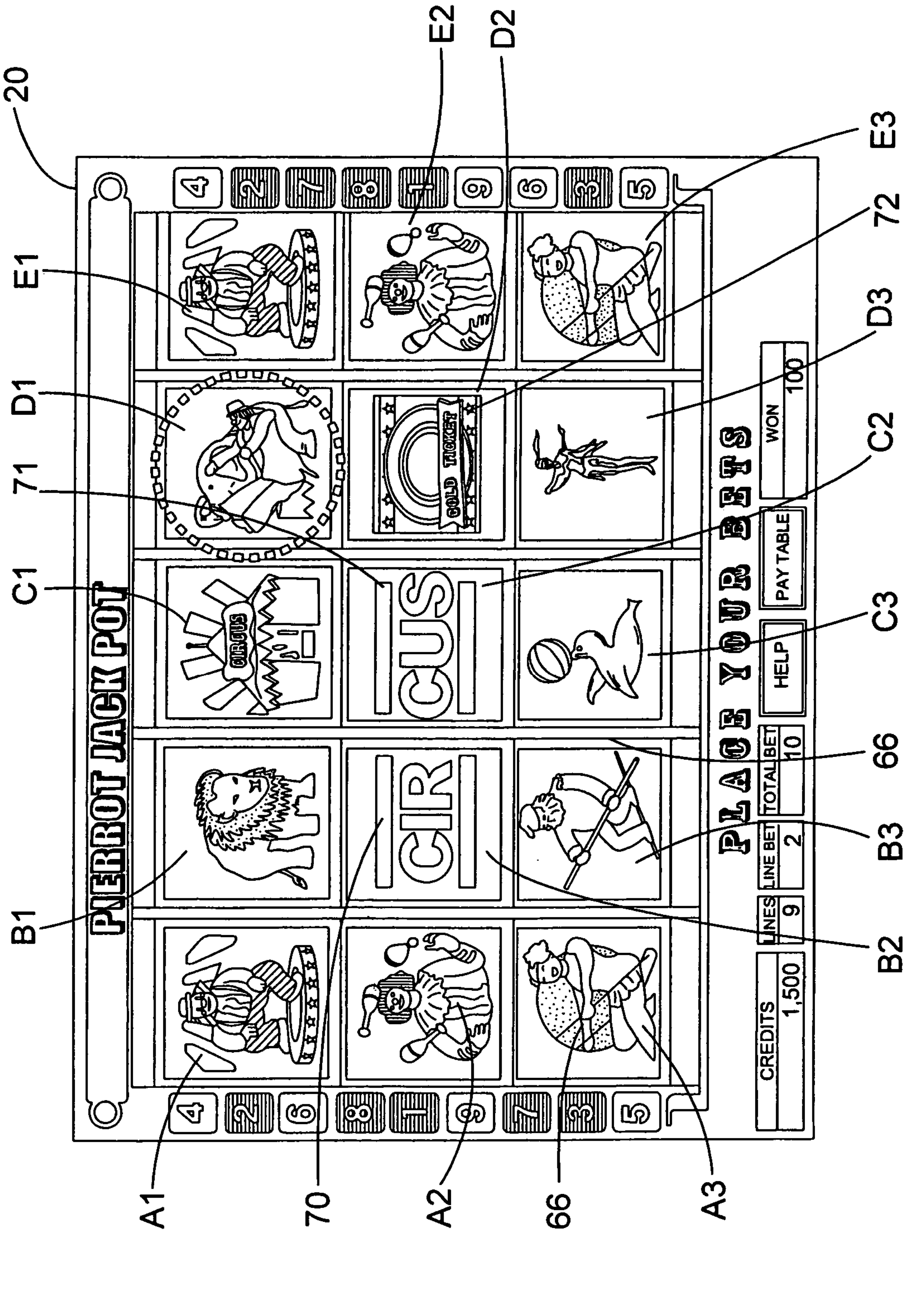
FIG. 13 is an illustration showing a situation where the clown character falls down and selects the elephant symbol on the main display.

Next, as shown in FIG. 13, CPU 51 controls image processing circuit 53 to cause clown character 66 to stop its movement and fall down on the symbol selected in S113 (S115). In the present embodiment, the player can grasp the fact that the symbol of that display region has been selected by the fact that the clown character 66 performs the action of falling down. It is assumed in the present embodiment that the ELEPHANT symbol displayed in display region D1 has been selected. Note that the present embodiment is such that through the falling down action of the clown, that symbol is selected, but another action could also indicate that the symbol had been selected. For example, the clown character 66 may simply stop over the symbol or perform another action such as a flip.

Next, in S116, CPU 51 determines whether or not a "COLLECT" mark is displayed in the symbol, selected by the falling down of the clown. This "COLLECT" mark is displayed in symbols which have once been selected by the clown's falling down. Thus, at the beginning of a bonus game, no marks are displayed on any of the symbols.

Then, if a COLLECT mark is not displayed in the selected symbol, processing proceeds to S117 and the type of the symbol is determined. A bonus is awarded to the player depending on the type of symbol. At this time, CPU 15 determines the bonus content based on Table 65 shown in FIG. 14.

Table 65 shown in FIG. 14 shows the correspondence relationship between the symbol selected by the falling down of the clown character 66 and the content of the bonus to be awarded to the player. This information is stored in the ROM area of main memory 52. As is clear from Table 65, in the case that any one of PIERROT (clown) (A), GAL (B), LION (C), ELEPHANT (D) is selected, processing proceeds to S118 and play advances into the second bonus game mode (below, this second bonus game is referred to as "sub-game"). On the other hand, in the case that one of the lower level five symbols, SEAL (E), LOPE (tight rope walker) (F), CLUB (juggler) (G), TENT (J), or BEAR (L) is selected, processing proceeds to S120 and payout of twice the total BET number in the slot game is paid out.

In S117, when it is ascertained that the ELEPHANT symbol (display region D1) been has selected, CPU 51 confirms execution of "Elephant's ring toss game", which is a sub-game, based on Table 65, and executes the "Elephant's ring toss game" program which is stored in second memory 55 of controller 50 (S119).

This sub-game unfolds on second display 30, and the content of the display on second display 30 is controlled by image processing circuit 56. In this way, by running the sub-game, which is another bonus game, on a display different from that of the initial bonus game, the player receives a strong impression that a new bonus game has started and the level of entertainment can be increased.

Upon starting "Elephant's ring toss game," image processing is performed such that, for example, clown character 66 which selected the elephant symbol on main display 20 is bounced up to second display 30 by that elephant. There, the clown character displayed on second display 30 throws rings at the trunk of another elephant which makes an appearance there, and a payout is paid to the player according to the number of rings which land encircling the elephant's trunk. In running this sub-game, the image processing for the clown's tossing of the rings is done based on a payout decision made ahead of time, based on a random number value in accordance with the program of second memory 55.

To explain another sub-game simply, in the case that the PIERROT (clown) symbol is selected, for example, the "clown showdown game" is executed. Two clowns appear in the scene and the player chooses one. Then, in the case that the clown the player has selected is the winner, based on the results of a tightrope walking or ball-riding showdown, the player is paid a specified payout. Note that for selection of the clown, selection buttons 31 and 32 may be used or a touch sensor may be provided on second display 30, the player making his selection by touching the clown on the screen.

Figure 15:
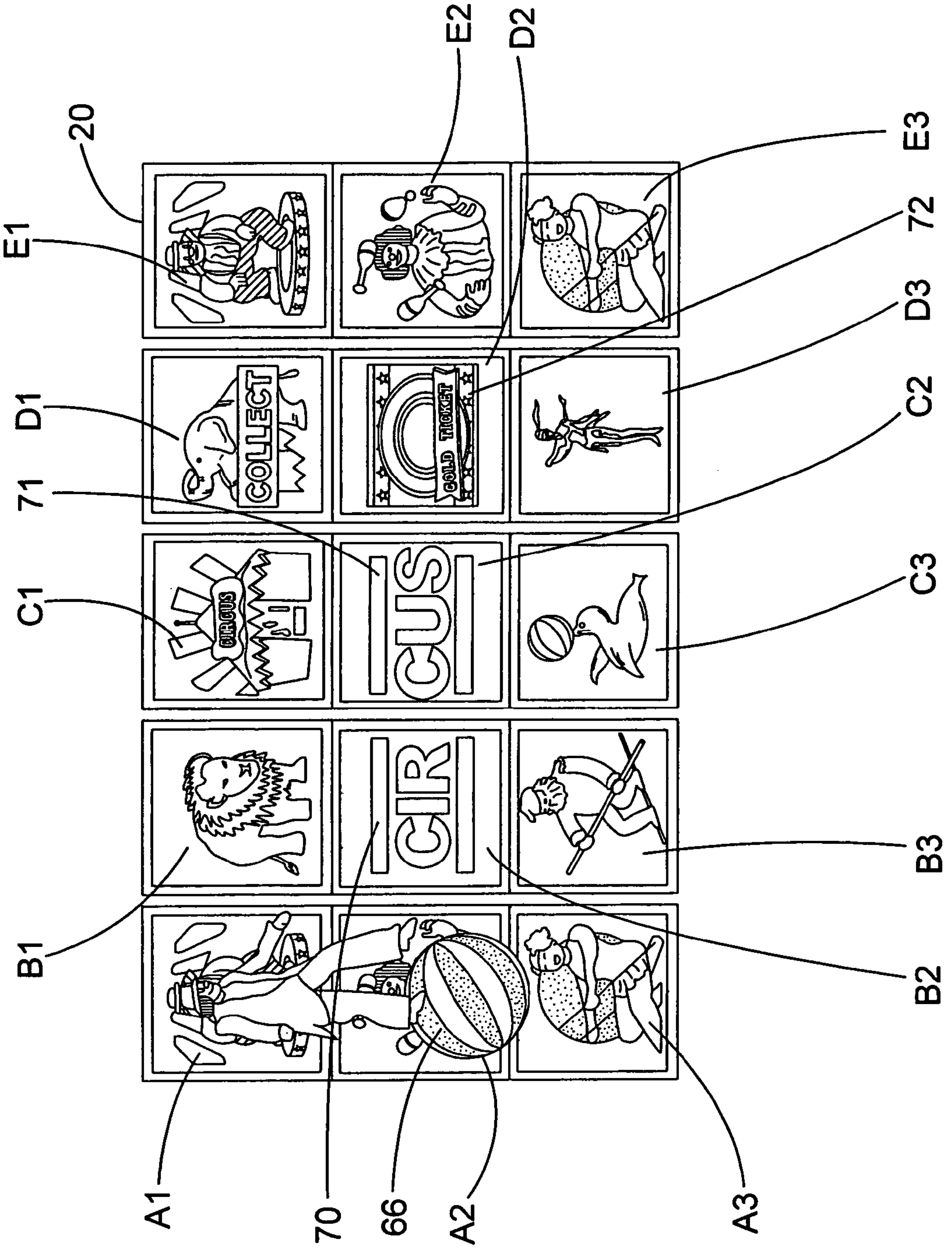
FIG. 15 is an illustration showing a situation where a COLLECT mark is displayed on the selected elephant symbol on the main display.

After awarding the player the bonus of a sub-game or a coin payout, in S121, CPU 51 controls image processing circuit 53 and displays a COLLECT mark (see FIG. 15) to indicate on the selected symbol (the elephant symbol) that clown character 66 has already selected that symbol by falling down on it. Image information for the COLLECT mark is stored in the ROM area of second memory 55.

Next, CPU 51 determines whether or not all the symbols surrounding TICKET symbols 70, 71, and 72 have been selected (S122). In the case that all the symbols have been selected, the bonus game ends and the player is notified of that fact, for example, through an indication on the display. On the other hand, in the case that not all of the symbols have been selected, processing returns to a stage before S113 and through the processing of S113 through S115, the clown character 66 is moved again and is made to select a symbol by falling down. In other words, the player is given another chance to obtain a bonus. In this way, by providing the player with the chance to gain bonuses multiple times, the level of player interest toward slot machine 10 can be enhanced. Note that in symbol selection in S113, previously selected symbols are also targets for selection.

In the case that there is no COLLECT mark displayed on the selected symbol, in S117 and following steps, a bonus is given to the player according to the type of symbol. On the other hand, in S116, if a COLLECT mark is displayed on the selected symbol (for example, the case where in FIG. 15, the elephant symbol of display region D1 is selected) the bonus game ends and the player is notified of that fact. Through setting in this way such that the bonus game ends when a character selects a display region in which a COLLECT mark is displayed for a second time because the region has been previously selected, the player hopes that clown character 66 will not fall down on a display region where the COLLECT mark is displayed, and thus the bonus game can be made even more thrilling.

In the case that no COLLECT mark is displayed on the selected symbol, and the player is awarded a sub-game or a specified payout, afterward in S121 a COLLECT mark is displayed on the selected symbol.

Figure 16:
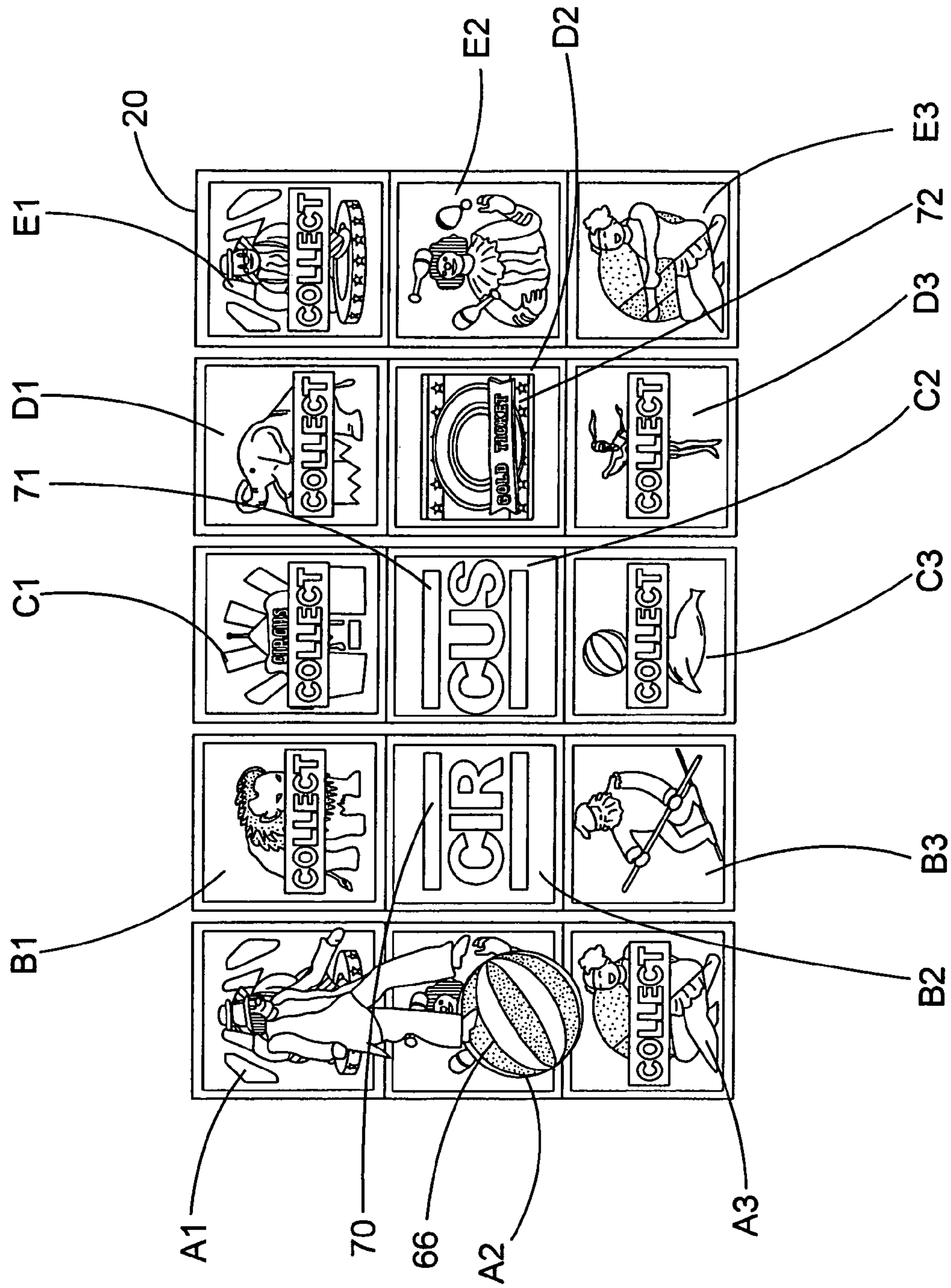
FIG. 16 is an illustration showing a situation where a COLLECT mark is displayed on a plurality of symbols on the main display.

Until the bonus game ends because all the symbols have been selected or until the bonus game ends because a COLLECT mark is selected, clown character 66 continues to select symbols and the player is given bonus chances. There, as shown in FIG. 16, as more bonuses are awarded, the number of symbols on which COLLECT marks are displayed grows. As the player's chances of being able to get a bonus gradually drop, the thrill of suspense increases.

As explained above, novelty is markedly enhanced by creating a relationship between the bonus game start condition which is the displaying of TICKET symbols 70, 71, and 72 in the center display regions of the (X−2) (in this case 3) columns of the X columns (here, 5 columns), excluding both side columns, and the bonus game content of clown character 66's movement over the display areas surrounding the central TICKET symbols 70, 71, and 72 and as a result, players can be attracted to slot machine 10. In addition, because the bonus game takes place in succession on main display 20 where the symbols are arranged, the player can readily grasp that a bonus game has begun.

In addition, in the present embodiment, the configuration is such that regardless of the row of reel 2, 3 and 4 in which the bonus symbol is displayed, the bonus game starts. However, it is also acceptable for transition to a bonus game to occur only in the case that the bonus symbol is displayed in the center row of each reel (in other words, when displayed in display regions B2, C2, and D2). However, in the former case, wherein the configuration is such that regardless of the row of reel 2, 3 and 4 in which the bonus symbol is displayed, the bonus game starts, the player feels that the chances to play a bonus game are increased, drawing further interest to slot machine 10.

Note that in the present embodiment, there are 3 rows by 5 columns of display regions, but the number of columns need not be limited to this, and any integer of 5 or larger is acceptable. In such a case, the condition for start of the bonus game is that bonus symbols be displayed in the (X−2) columns, excluding both side columns. For example, in the case that display regions in 3 rows by 7 columns are provided, it would be necessary for bonus symbols to be displayed in 5 columns, excluding the left and right side columns. In this case, just as with the above-mentioned embodiment, there exists one row of display regions above, below, and on both sides of the group of (X−2) bonus symbols lined up on the center row and the abovementioned type of bonus game can be implemented.

Figure 17:
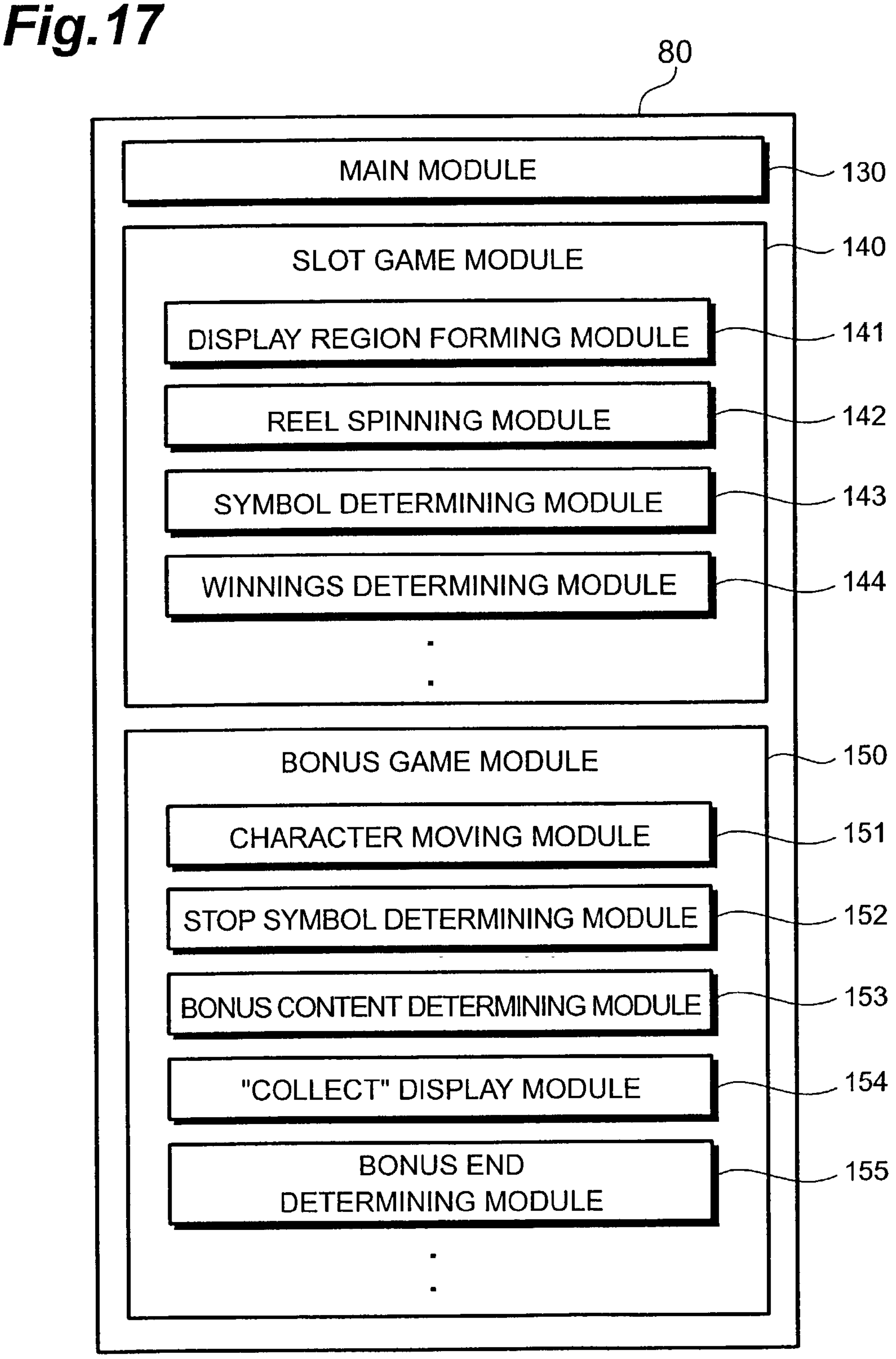
FIG. 17 is a configuration diagram showing each module in the program of the present invention.
Figure 18:
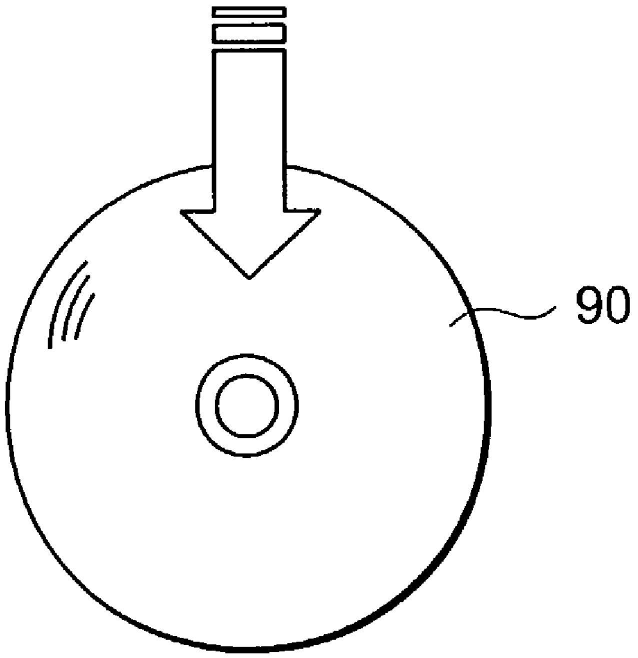
FIG. 18 is a diagram showing a computer-readable recording medium (CD-ROM) in which the program of FIG. 17 is recorded.

Next, referring to FIGS. 17 and 18, preferred embodiments of a program and a computer-readable recording medium on which the program is recorded are described.

FIG. 17 is a diagram showing each module in program 80 of the present embodiment and FIG. 18 is a diagram showing the CD-ROM (recording medium) 90 into which program 80 is written.

Program 80 includes main module 130 which integrates the processing, slot game module 140 which relates to slot game processing, and bonus game module 150 which relates to bonus game processing.

Further, slot game module 140 includes at least: display region forming module 141, reel turning module 142, symbol determining module 143, and winnings determining module 144.

Display region forming module 141 forms on the display display regions of 3 rows by X columns (where X is an integer of 5 or greater) in which symbols (including bonus symbols) are displayed. Reel turning module 142 displays the turning reels on the display. Symbol determining module 143 determines the symbols to be displayed in each display region based on random number values. Winnings determining module 144 makes decisions as to winnings, based on the arrangement of symbols displayed in each display region. In the case that winnings determining module 144 detects that bonus symbols are displayed in each of the (X−2) display regions which are the X columns excluding the two side columns, reel turning module 142 moves the bonus symbols of each column to the center row of the three rows, and advances to the bonus game. By the computer's executing each of these modules, the processing for each of S101 through S111 in aforementioned slot machine 10 can be accomplished.

Bonus game module 150 includes at least: character moving module 151, "stop symbol" determining module 152, bonus content determining module 153, COLLECT display module 154, and bonus end determining module 155.

In a bonus game, character moving module 151 moves a prescribed character (this will be explained below with the clown character as the specific character, as in the abovementioned example) around the central bonus symbols. "Stop symbol" determining module 152 determines, based on random number values, the symbol on which the clown character will perform a prescribed action (for example, falling down). Bonus content determining module 153 determines the content of the bonus to be awarded to the player based on the table (see FIG. 14) which shows the correspondence relationship between the type of selected symbol and the content of the bonus. COLLECT display module 154 displays a COLLECT mark on symbols selected by the clown character's falling down, to indicate that they have been previously selected. Bonus end determining module 155 determines that the bonus game has ended in the case that the clown character has selected all the symbols surrounding the bonus symbols or in the case that a symbol displaying a COLLECT mark is selected. Through the computer's execution of each of these modules, the processing of each of S112 through S122 of FIG. 8 can be accomplished in the aforementioned slot machine 10.

By installing program 80 of the above type, received as a carrier wave via a communications network such as the Internet, or program 80 recorded in a recording medium such as CR-ROM 90, in any type of computer, such as a personal computer, a PDA (Personal Digital Assistant), etc., games similar to the abovementioned slot machine 10 can be realized.

Note that it is acceptable to build into program 80 the image data for the symbols, characters, etc. necessary for actualizing the game; the pay table; the correspondence table relating the symbol selected in the bonus game and the bonus content; etc. Alternatively, these data, etc. may be installed in the computer from a source other than the program. Further, all the various modules necessary for the processing performed by slot machine 10, not only the modules shown in FIG. 17, may be built into in program 80.

In addition, the above-mentioned recording device can be any kind of device as long as the information written into it can be read out by a computer. For example, this corresponds to magnetic disks such as floppy disks, optical disks such as DVD's, semiconductor storage devices, etc.

Above, the invention made by the present inventors was described concretely based on an embodiment, but the present invention is not limited to the abovementioned embodiment. For example, without displaying spin type reels, the symbols in each display region can be made to rotate independently in the up-down direction. In addition, the bonus symbols and the character which moves on the display in the bonus game are not limited to those described above, but a variety of changes could be made.

In addition, selection of symbols for display in the display regions may be performed based on random number values obtained with a random number generator, without utilizing random numbers obtained from the program.

Further, the controller can be made into separate units for main display use and second display use respectively, or game CPU's may be provided for displaying games on each display. In addition, the main display and second display may be any type of device, such as CRT plasma type, organic EL, etc.

In addition, the gaming apparatus according to the present invention is not limited to the above-described slot machine. For example, the slot game may be implemented on the liquid crystal screen of a pachinko game, or it could be a game apparatus of the type provided with a stop button whereby the player can stop the reels (for example, the game type known as "Pachi-suro," short for Pachi[nko]-suro[tto] [="slot"]).

As described above, by means of the present invention, it is possible to attract player interest through renewal of bonus game content and to enable a player readily to grasp that a bonus game is in progress.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A gaming apparatus comprising:

a first display having three rows by X columns (X being an integer and at least five) of display regions for displaying symbols, said X columns including two outermost columns at respective sides of the display and (X−2) columns between said two outermost columns; and a controller for controlling display content of said first display and executing a program, wherein said controller, according to the program, determines, from among a plurality of the symbols, including bonus symbols, which of the symbols shall be displayed in said display regions, decides winnings based on arrangement of the symbols displayed in said display regions, causes a bonus game to start on said first display only when (X−2) bonus symbols are displayed in respective display regions on a center row of said three rows, and not in either of said two outermost columns, in the bonus game, causes a character to move, superimposed, only on said display regions surrounding the bonus symbols displayed on said center row, and, thereafter, causes an interaction between the character and a randomly selected one of the symbols displayed on said display regions surrounding the bonus symbols displayed on said center row, and determines content of a bonus awarded to a player based on the symbol displayed in said display region with which the character performs the interaction.

2. The gaming apparatus according to claim 1, comprising a memory storing a table showing a correspondence relationship between the symbols and the content of the bonus, wherein said controller determines the content of a bonus awarded to the player based on the table stored in said memory.

3. The gaming apparatus according to claim 1, wherein, when the bonus symbols are displayed in each of said X columns, excepting said two outermost columns, said controller moves the bonus symbols in the columns to said center row of said three rows and starts the bonus game.

4. The gaming apparatus according to claim 1, wherein said apparatus is a slot machine, and said controller determines the symbols to be displayed in said display regions from among said plurality of symbols according to random number values.

5. The gaming apparatus according to claim 1, wherein said apparatus is a slot machine, and said controller displays an image of three rows by X columns of reels on said first display.

6. The gaming apparatus according to claim 1, wherein, after awarding a bonus to the player, in a bonus game, said controller causes the character to move again on said display regions surrounding the bonus symbols displayed on said center row, and, thereafter, causes another interaction between the character and the symbol displayed on one of said display regions.

7. The gaming apparatus according to claim 6, wherein said controller causes a mark to be displayed on a display region where the character has interacted, indicating that the character has interacted with the symbol in that display region, and, in the event that the character interacts with a symbol on a display region having the mark displayed, causes the bonus game to end.

8. The gaming apparatus according to claim 1, wherein the bonus awarded to the player consists of coins.

9. The gaming apparatus according to claim 1, wherein the bonus awarded to the player is a second bonus game.

10. The gaming apparatus according to claim 9, further comprising a second display, wherein the second bonus game is displayed on said second display.

11. A method for controlling a gaming apparatus comprising a display having display regions for displaying symbols, and a controller for controlling display content of said display, the method comprising:

displaying on said display the display regions as three rows and X columns (X being an integer and at least five), said X columns including two outermost columns at respective sides of said display and (X−2) columns between said two outermost columns;

determining, from among a plurality of the symbols, including bonus symbols, which of the symbols shall be displayed in said display regions;

deciding winnings based on arrangement of the symbols displayed in said display regions;

causing a bonus game to start on said display only when (X−2) bonus symbols are displayed in respective display regions on a center row of said three rows, and not in either of said two outermost columns;

in the bonus game, causing a character to move, superimposed, only on said display regions surrounding the bonus symbols displayed on said center row, and, thereafter, causing an interaction between the character and a randomly selected one of the symbols displayed on said display regions surrounding the bonus symbols displayed on said center row; and determining content of a bonus awarded to a player based on the symbol displayed in said display region in which the character performs the interaction.

12. The method for controlling a gaming apparatus of claim 11, wherein said gaming apparatus comprises a memory for storing a table showing a correspondence relationship between the symbols and the content of a bonus, and determining content of a bonus awarded to the player based on the table stored in said memory.

13. The method for controlling a gaming apparatus of claim 11, wherein, when the bonus symbols are displayed in the X columns, excepting said two outermost columns, moving the bonus symbols in said columns to said center row of said three rows and starting the bonus game.

14. The method for controlling a gaming apparatus of claim 11, wherein, after awarding a bonus game to a player, in a bonus game, causing the character to move again on said display regions surrounding the bonus symbols displayed on said center row, and, thereafter, causing another interaction between the character and the symbol displayed on one of said display regions.

15. The method for controlling a gaming apparatus of claim 14, including displaying a mark on a display region where the character has interacted, indicating that the character has interacted with the symbol displayed in that display region, and, in the event that the character interacts with a symbol on a display region having the mark displayed, ending the bonus game.

16. A computer readable recording medium on which is recorded a program which causes a computer to execute:

displaying symbols on display regions, in three rows and X columns (X being an integer and at least five), said X columns including two outermost columns at respective outermost sides and (X−2) columns between said two outermost columns;

determining, from among a plurality of the symbols, including bonus symbols, which of the symbols shall be displayed in said display regions;

deciding winnings based on arrangement of the symbols displayed in said display regions;

causing a bonus game to start on only when (X−2) bonus symbols are displayed in respective display regions on a center row of said three rows, and not in either of said two outermost columns;

in the bonus game, causing a character to move, superimposed, only on said display regions surrounding the bonus symbols displayed on said center row, and, thereafter, causing an interaction between the character and a randomly selected one of the symbols displayed on said display regions surrounding the bonus symbols displayed on said center row; and determining content of a bonus awarded to a player based on the symbol displayed in said display region in which the character performs the interaction.

17. The computer readable recording medium of claim 16 which further causes the computer to, when the bonus symbols are displayed in each of the X columns, excepting said two outermost columns, move the bonus symbols in said columns to said center row of the three rows and starting the bonus game.

18. The computer readable recording medium of claim 16 which further causes the computer to, after awarding a bonus game to a player, in a bonus game, causing the character to move again on said display regions surrounding the bonus symbols displayed on the center row, and, thereafter, causing another interaction between the character and the symbol displayed on one of the display regions.

19. The computer readable recording medium of claim 18 which further causes the computer to display a mark on a display region where the character has interacted, indicating that the character has interacted with the symbol displayed in that display region, and, in the event that the character interacts with a symbol on a display region having the mark displayed, causing the bonus game to end.

* * * * *